United States Patent
Reynolds et al.

(10) Patent No.: US 10,375,288 B2
(45) Date of Patent: Aug. 6, 2019

(54) MOTION CAPTURE SYSTEM

(71) Applicant: OXFORD METRICS PLC, Yarnton, Oxon (GB)

(72) Inventors: David Reynolds, Oxford (GB); Matthew Kingman, Oxford (GB); Ben Freeman, Oxford (GB); Shane Lowe, Oxford (GB); Paul Tate, Oxford (GB); Stephen Malton, Oxford (GB); Imogen Moorhouse, Oxford (GB)

(73) Assignee: OXFORD METRICS PLC, Yarnton, Oxon (GB)

( * ) Notice: Subject to any disclaimer, the term of this patent is extended or adjusted under 35 U.S.C. 154(b) by 0 days.

(21) Appl. No.: 15/580,438

(22) PCT Filed: Apr. 22, 2016

(86) PCT No.: PCT/GB2016/051130
§ 371 (c)(1),
(2) Date: Dec. 7, 2017

(87) PCT Pub. No.: WO2016/198827
PCT Pub. Date: Dec. 15, 2016

(65) Prior Publication Data
US 2018/0176446 A1    Jun. 21, 2018

(30) Foreign Application Priority Data
Jun. 9, 2015  (GB) .................................. 1509993.0

(51) Int. Cl.
*H04N 7/18* (2006.01)
*H04N 5/232* (2006.01)
(Continued)

(52) U.S. Cl.
CPC ....... *H04N 5/23203* (2013.01); *H04N 5/2224* (2013.01); *H04N 5/2253* (2013.01); *H04N 5/247* (2013.01)

(58) Field of Classification Search
CPC ................................................... H04N 5/23203
(Continued)

(56) References Cited

U.S. PATENT DOCUMENTS

| 5,878,283 A | 3/1999 | House et al. |
| 6,697,105 B1 * | 2/2004 | Kato .................. H04N 5/23203 |
| | | 348/211.11 |

(Continued)

FOREIGN PATENT DOCUMENTS

| EP | 1 713 254 A2 | 10/2006 |
| EP | 2 642 748 A1 | 9/2013 |
| WO | WO-2014/092552 A2 | 6/2014 |

OTHER PUBLICATIONS

British Search Report issued in the corresponding Great Britain Patent Application No. GB1509993.0, dated Dec. 3, 2015.
(Continued)

*Primary Examiner* — Leron Beck
(74) *Attorney, Agent, or Firm* — Foley & Lardner LLP

(57) ABSTRACT

Systems and methods for motion capture are disclosed. In one arrangement a plurality of cameras are provided and a processing unit is configured to perform processing using image data from each of the plurality of cameras. Each of the cameras comprises an accelerometer and the processing unit is configured to perform processing that is dependent on an output from the accelerometers. In another arrangement each of the cameras comprises a temperature sensor and the processing unit is configured to perform processing that is dependent on an output from the temperature sensors.

21 Claims, 2 Drawing Sheets

(51) Int. Cl.
*H04N 5/222* (2006.01)
*H04N 5/247* (2006.01)
*H04N 5/225* (2006.01)

(58) Field of Classification Search
USPC .......................................................... 348/159
See application file for complete search history.

(56) References Cited

U.S. PATENT DOCUMENTS

| | | | |
|---|---|---|---|
| 9,438,800 B1* | 9/2016 | Kozko | G06T 11/00 |
| 2006/0209910 A1* | 9/2006 | Fukunaga | G02B 6/4224 |
| | | | 372/9 |
| 2007/0091178 A1* | 4/2007 | Cotter | G06K 9/3216 |
| | | | 348/159 |
| 2009/0174782 A1 | 7/2009 | Kahn et al. | |
| 2010/0129068 A1 | 5/2010 | Binda et al. | |
| 2011/0149094 A1 | 6/2011 | Chen et al. | |
| 2011/0267456 A1 | 11/2011 | Adermann | |
| 2012/0026379 A1 | 2/2012 | Mori et al. | |
| 2012/0262558 A1* | 10/2012 | Boger | G02B 27/0093 |
| | | | 348/61 |
| 2012/0327194 A1* | 12/2012 | Shiratori | G06K 9/00342 |
| | | | 348/47 |
| 2013/0002855 A1* | 1/2013 | Ratti | H04N 13/388 |
| | | | 348/117 |
| 2013/0021486 A1 | 1/2013 | Richardson | |
| 2013/0038766 A1 | 2/2013 | Perlman et al. | |
| 2013/0057713 A1 | 3/2013 | Khawand | |
| 2013/0121367 A1 | 5/2013 | Ahuja et al. | |
| 2013/0271602 A1 | 10/2013 | Bentley et al. | |
| 2014/0086590 A1* | 3/2014 | Ganick | G06Q 30/02 |
| | | | 398/118 |
| 2014/0176663 A1 | 6/2014 | Cutler et al. | |
| 2014/0320687 A1 | 10/2014 | Chau et al. | |
| 2015/0156485 A1 | 6/2015 | Kravitz et al. | |
| 2016/0343234 A1* | 11/2016 | Arndt | G06K 7/10366 |

OTHER PUBLICATIONS

International Preliminary Report on Patentability issued in the corresponding International Patent Application No. PCT/GB2016/051130, dated Dec. 12, 2017.

* cited by examiner

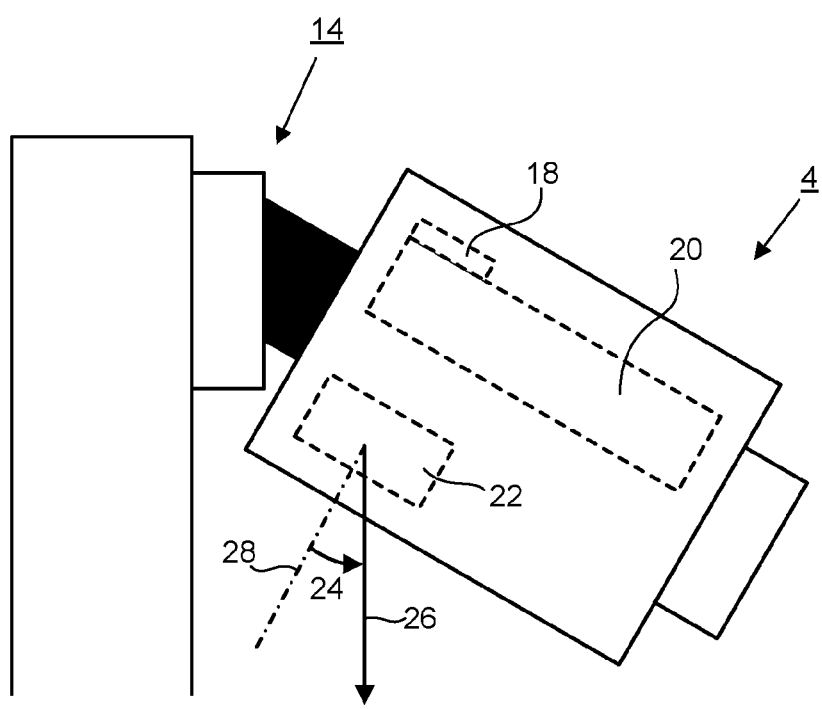

MOTION CAPTURE SYSTEM

CROSS-REFERENCE TO RELATED APPLICATIONS

The present application is a U.S. national stage application of International Patent Application No. PCT/GB2016/051130, filed Apr. 22, 2016, which claims the benefit of priority to GB Patent Application No. 1509993.0, filed Jun. 9, 2015, the entireties of which are incorporated herein by reference.

The present invention relates to a motion capture system and a method of performing motion capture, in which a plurality of cameras are each provided with an accelerometer and/or a temperature sensor.

A motion capture system typically comprises a plurality of cameras configured to monitor a target region in which the movements of a target, for example an actor, are to be captured. The captured movements may be used to animate a digital character in a film or computer game based on the actor's movements, for example. Typically, in such systems each of the cameras will need to be mounted at separate locations and directed towards the target region. The cameras will also need to be calibrated and connected to a processing unit such as a desktop or laptop computer, or a tablet. Setting up such motion capture systems can be time consuming, requiring for example multiple return trips for an operator between the processing unit and each of the cameras and/or the involvement of multiple people. For example, one person might interact directly with the processing unit while one or more other people may move around the room individually adjusting and checking each of the cameras while communicating with the person at the processing unit. The person at the processing unit may provide feedback to the moving operator about the image being captured by each of the cameras, as the moving operator moves from one camera to the next.

Motion capture systems may be sensitive to environmental conditions and to disturbances. For example, deviations in the quality of a camera mounting (e.g. due to knocks, thermal expansion/contraction, bending, etc.) may cause the position or orientation of the camera to change over time. This can have a negative impact on the motion capture process and/or require frequent and time consuming recalibrations.

A further challenge with existing systems is that temperature variations within the cameras themselves may alter the performance of the cameras, for example by causing differences in the optical path from a lens through to an imager of the camera. These effects can be mitigated in some circumstances by calibrating the cameras after the temperature has reached a steady state. However, judging when to perform such calibration is difficult. Users may be advised to wait a predetermined period after start up of the system before performing camera calibration and beginning use of the system. However, this can cause inconvenient delay. Furthermore, such an approach is not effective where a steady state temperature is not reached reproducibly or where the temperature varies during use of the system, for example due to variations in the activity of individual cameras or in the temperature of the surrounding environment.

It is an object of the invention to provide a motion capture system and method that at least partially address one or more of the challenges discussed above.

According to an aspect of the invention, there is provided a motion capture system comprising: a plurality of cameras; and a processing unit configured to perform processing using image data from each of the plurality of cameras, wherein each of the cameras comprises an accelerometer and the processing unit is configured to perform processing that is dependent on an output from the accelerometers.

Thus, a system is provided in which individual cameras can respond to output from an accelerometer provided in each camera. This capability enhances flexibility in how the motion capture system can be set up and maintained, facilitating in particular procedures which involve close proximity of a user with individual cameras. For example, the system can be configured to use the accelerometer outputs to allow a user to select individual cameras by causing perturbations in the accelerometer outputs, e.g. by tapping or double tapping a camera. The accelerometers may alternatively or additionally be used to detect unwanted deviations in the orientation of cameras, thereby to prompt investigatory action and/or recalibration procedures.

According to an aspect of the invention, there is provided a motion capture system comprising: a plurality of cameras; and a processing unit configured to perform processing using image data from each of the plurality of cameras, wherein each of the cameras comprises a temperature sensor and the processing unit is configured to perform processing that is dependent on an output from the temperature sensors.

Thus, a system is provided in which individual cameras can respond to variations in a temperature of each camera. This capability facilitates detection of when a steady state temperature has been reached after a powering on of the camera, making it possible for calibration procedures to be started more reliably in the steady state regime, and potentially earlier than would be possible using other approaches. The capability also makes it possible to respond to variations in temperature that may occur at times other than shortly after powering on, for example due to changes in the environmental temperature.

According to an alternative aspect of the invention, there is provided a method of performing motion capture using a plurality of cameras, wherein each of the cameras comprises an accelerometer, the method comprising: performing processing at a processing unit that is dependent on an output from the accelerometers.

According to an alternative aspect of the invention, there is provided a method of performing motion capture using a plurality of cameras, wherein each of the cameras comprises a temperature sensor, the method comprising: performing processing at a processing unit that is dependent on an output from the temperature sensor.

Embodiments of the invention will now be described, by way of example only, with reference to the accompanying drawings in which corresponding reference symbols indicate corresponding parts, and in which:

FIG. 3 is a schematic side view of a single one of the plurality of cameras of FIG. 2.

Figure 1:
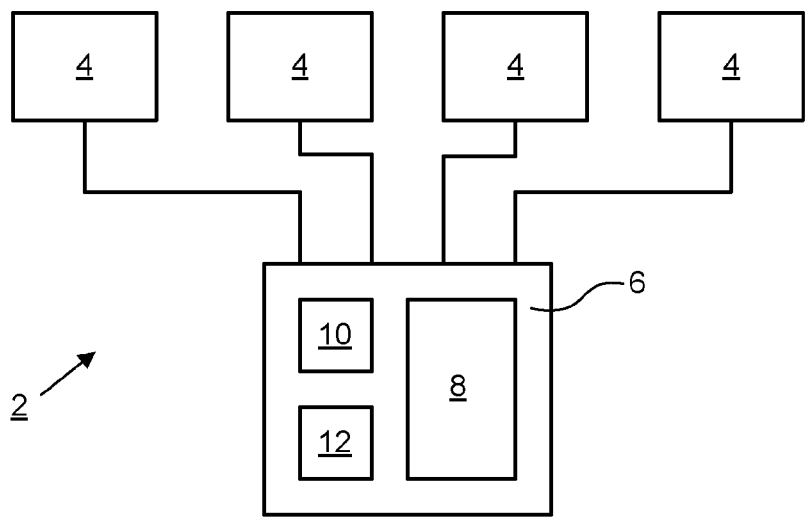
FIG. 1 depicts a motion capture system.
Figure 2:
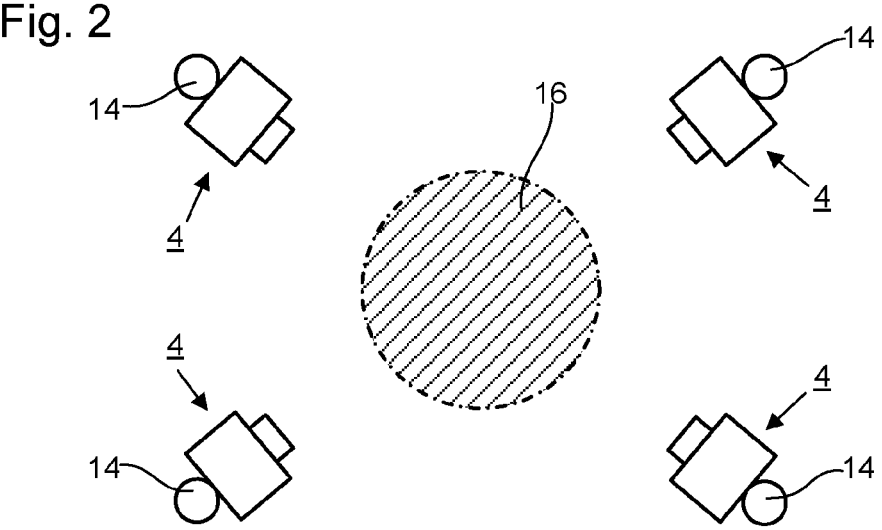
FIG. 2 depicts a top view of a plurality of cameras of a motion capture system directed towards a target region.

In an embodiment, an example of which is shown in FIGS. 1-3, there is provided a motion capture system 2 comprising a plurality of cameras 4. A processing unit 6 is configured to perform processing using image data received from each of the plurality of cameras 4. The processing may comprise processing associated with performing motion capture for example. In this context, motion capture is understood to encompass at least any process or technique of recording patterns of movement digitally, for example for recording of an actor's movements for the purpose of animating a digital character in a film or computer game.

Optionally, one or more of the plurality of cameras 4 may be configured to perform processing that contributes to the motion capture procedure. For example a camera may pre-process image data captured by the camera before sending data to the processing unit. The processing unit 6 may take various forms. For example, the processing unit 6 may comprise a computer (e.g. a desktop or laptop PC), a tablet computer, a smart telephone, or any combination of these in communication with each other. The processing unit 6 may comprise a display 8. The processing unit 6 may further comprise processing hardware 10 (e.g. CPU, memory, etc.), and an interface 12 allowing a user to interact with the processing unit 6. The interface may comprise a touch screen, keyboard, mouse, or other input device.

In an embodiment each of the cameras 4 comprises an accelerometer 22. An example of such a camera is shown in FIG. 3. In embodiments of this type the processing unit 6 is configured to perform processing that is dependent on an output from the accelerometers 22.

In an embodiment the processing unit 6 is configured to select one of the cameras 4 based on an output from the accelerometer 22 of that camera. The processing unit 6 is further configured to perform a selected-camera processing which depends on which of the cameras 4 has been selected. The selected-camera processing may comprise various different functionalities associated with the selected camera. In an embodiment, the selected-camera processing comprises displaying data, for example on the display 8, from the selected camera 4. This functionality therefore makes it possible for a user to view data associated with a particular camera merely by causing an output from the accelerometer to vary in a particular way (e.g. by tapping or otherwise manipulating the camera 4).

In an embodiment, the selected-camera processing comprises displaying data from a plurality of the cameras and providing visual information indicating which of the displayed data corresponds to the selected camera. For example, the processing unit 6 may be configured to display image data captured by more than one of the cameras 4 in a corresponding plurality of different windows in the display 8. The selected camera may be indicated by highlighting the window corresponding to the selected camera, or by bringing the window to the front relative to other windows, for example.

Alternatively or additionally, the selected-camera processing may comprise displaying data from the selected camera and not displaying data from any other camera. In this way, manipulation of the camera to cause a characteristic change in the output from the accelerometer 22 in that camera can be used to cause the display 8 to switch between displaying data from different cameras.

The above-described functionality may be particularly convenient in the case where the processing unit 6 comprises a portable unit, such as a laptop or tablet. In this case, a user can carry the portable unit from one camera 4 to another camera 4 in the system and conveniently select to view data associated with a camera that he is currently next to merely by causing the output from the accelerometer to change (e.g. by tapping the camera 4). This functionality avoids the user having to manually interact with the portable unit itself in order to select a camera. This approach may save considerable time and effort, particularly in the case where many different cameras 4 are provided.

In an embodiment, the displayed data of the selected-camera processing comprises image data captured by the selected camera 4. Alternatively or additionally, the displayed data comprises configuration data of the selected camera. The configuration data may comprise any operating parameters or other parameters of the camera 4. In an embodiment, the selected-camera processing comprises providing a selected camera interface, for example as part of the display 8, for example a touch screen active part of the display 12, which allows a user to control the selected camera 4. Thus, by tapping or otherwise manipulating the camera 4 to provide a change in the output from the accelerometer 22, the user is able conveniently to bring up an interface which allows him to control the selected camera 4 via the processing unit 6 (e.g. laptop or tablet).

The selected-camera interface may allow control of a plurality of cameras 4 and provide a visual indication indicating which of the cameras 4 is the selected camera 4. This approach allows the user to view configuration data or other relevant data from other cameras while controlling the selected camera 4. This may be useful where the data from other cameras is relevant for comparison or reference purposes.

In an embodiment, the selected-camera interface is configured to allow control of the selected camera 4 and no other camera 4. Various other functionalities associated with the selected camera 4 may be provided by the selected-camera interface.

In an embodiment, the processing unit 6 is configured to select one of the cameras 4 in response to a perturbation in the output of the accelerometer 22 (e.g. an amplitude of the perturbation, proportional to a magnitude of an acceleration, or a duration of the perturbation) from that camera 4 that is larger than a predetermined threshold. The perturbation may be caused for example by a user of the system tapping the camera 4 lightly.

Alternatively or additionally, the processing unit 6 may be configured to select one of the cameras 4 when an output from the accelerometer 22 from that camera 4 matches a predetermined signature output. The predetermined signature output may correspond to an output consistent with a user tapping the camera with a finger, or any other manipulation of the camera by a user which does not disturb the mounting of the camera 4. Typically, therefore, the processing unit 6 is configured to detect relatively light interaction between the user and the camera 4, such as tapping (single or multiple, such as double tapping), or other similar, light interactions. The predetermined signature output may be determined by recording the response of the camera accelerometer 22 to one or more types of envisaged interaction. For example, the response to a variety of single finger taps could be recorded and an average response could be used as a predetermined signature output. When a user taps the camera 4 in use, the response of the accelerometer 22 can be compared to the recorded average response and if the two responses are sufficiently similar it can be deduced that there is a match between the output from the accelerometer and the predetermined signature output. Various aspects of the accelerometer output could be used for the comparison, including for example the duration of the perturbation in the output, the amplitude of the perturbation of the output, or the variation with time of the amplitude of the perturbation. Using the variation with time of the amplitude of the perturbation may be particularly appropriate for example where the interaction by the user takes a more complex form, for example a double tap. Here, it may be appropriate for example to detect a pair of local maxima in the perturbation of the accelerator output 22 and/or the time separation of the maxima in order to determine whether the user interaction matches the predetermined signature output for a double tap.

In an embodiment, the processing unit 6 is configured to respond differently according to the direction of a perturbation in the output from the accelerometer 22. For example, the processing unit 6 may be configured to perform a first direction-selected processing when the camera 4 is tapped on one side (and thus in a first direction, for example in an inward direction substantially perpendicular to the first side) and a second direction-selected processing, different from the first direction-selected processing, when the camera 4 is tapped on a second side (and thus in a second direction, different from the first direction, for example in an inward direction substantially perpendicular to the second side). For example, the first direction-selected processing may comprise displaying image data captured by the camera and the second direction-selected processing may comprise displaying configuration data of the camera.

FIG. 2 depicts how four cameras 4 of a motion capture system 2 may be configured so as to be directed towards a target region 16. The provision of four cameras 4 is exemplary. Fewer than four or more than four cameras 4 may be provided according to requirements. Typically, each of the cameras 4 will be a physically separate unit. Each camera 4 is typically mountable independently of the other cameras 4. In the example shown, the cameras 2 are mounted to separate mounting supports 14.

The cameras 4 may be configured to interact with the processing unit 6 in various ways. Wires may be provided between each of the cameras 4 and the processing unit 6, for example. Alternatively or additionally, wireless data transfer may be possible between the cameras 4 and the processing unit 6.

In the above-described embodiments, accelerometers 22 in the cameras 4 are used to provide a convenient way for a user to select a camera that he is in close proximity with and/or to select functionality associated with that camera. However, the accelerometers 22 may be used for other purposes, in addition to the functionalities described above, or as an alternative to the functionalities described above.

For example, in an embodiment the processing unit 6 is configured to detect a change in an orientation of one or more of the cameras 4 based on an output from the accelerometers 22. This may be achieved by detecting a change in the direction of gravity relative to the camera 4. This is illustrated schematically in the side view of FIG. 3. Arrow 26 indicates the direction of gravity relative to the accelerometer 22. Gravity acts as an acceleration and is therefore detected by the accelerometer 22. The accelerometer 22 is able to detect the direction of gravity 26 relative to a reference axis 28 of the camera 4. In the example shown in FIG. 3, this is used to allow the accelerometer 22 to determine an angle 24 of inclination of the camera 4 relative to the vertical. Typically, when the motion capture system 2 is set up, one or more of the cameras 4 will be mounted fixedly and then calibrated before the motion capture system is used to capture motion in the target region 16. Any deviation in the position or orientation of a camera 4 after the calibration process has finished will lead to a reduction in the quality of the image capture process. Such deviations may occur for example due to knocks to the camera 4 or mounting 14, variations in temperature and associated thermal expansion/contraction in the camera 4 or mounting 14, or yielding or bending of the mounting 14, etc. The inventors have recognised that a wide range of such deviations will involve a change in orientation of the camera 4 relative to the direction of gravity and that this can be detected by an accelerometer 22. Thus, the accelerometer 22 provides a convenient and accurate way for the processing unit 6 to detect when there has been a deviations in the camera mounting. Even changes which occur slowly over time, such as when a mounting is gradually bending or changing due to long time-scale temperature variations, etc., the accelerometer 22 can still detect changes in the orientation by comparing an absolute measurement of the orientation at a camera 4 with an absolute recording of the orientation of the same camera 4 at a previous time. For example, when the system is left overnight, a comparison can be made between the outputs from the accelerometers 22 in the morning compared with the outputs recorded from the previous day. Any significant variations (e.g. variations that are larger than a predetermined threshold) will indicate that a camera has been disturbed significantly and that checking of the mounting and/or recalibration is therefore necessary.

In the above-described embodiments, each of the cameras 4 is provided with an accelerometer 22. In these and other embodiments each of the cameras 4 may alternatively or additionally comprise one or more other sensors which provide useful information about the state of the camera.

In an embodiment, each of the cameras 4 comprises a temperature sensor 18. The temperature sensor 18 may be provided instead of or in addition to the accelerometer 22. The processing unit 6 is configured in such embodiments to perform processing that is dependent on an output from the temperature sensor 18. In an embodiment the processing unit 6 is configured to provide a visual indication of the temperature of one or more of the cameras 4. The visual indication may be provided on the display 12 of the processing unit 6 for example. Alternatively or additionally, a visual indication of the temperature may be provided at the individual cameras 4. In an embodiment, the temperature sensor 18 of each camera 4 is mounted on computer processing hardware 20, such as a PCB, within the camera 4. The temperature sensor 18 in such an embodiment is therefore configured to measure the temperature of the computer processing hardware 20. Typically, when a camera 4 is powered on power is supplied to the computer processing hardware 20 within the camera 4, which causes the hardware 20 to heat up. The heating can lead to changes in operating characteristics of the computer processing hardware 20 and/or in characteristics of other elements of the camera. For example, heat can be conducted from the computer processing hardware 20 to optical or mechanical elements of the camera, for example between a lens of the camera 4 and an image capture unit configured to transform light received at pixels thereof into an electrical signal representing the image captured. By measuring the temperature of the computer processing hardware 20 it is possible to detect for example when the temperature of the hardware 20 reaches a steady state. At this point, further thermal-driven changes in the properties of the camera 4 are likely to be very small. A user can therefore safely commence calibration procedures at this point in the knowledge that subsequent temperature variations are unlikely to cause significant deviation from the calibrated state. Relative to alternative approaches in which a user simply waits for a predetermined type which is chosen so as to be safely longer than any temperature settling period, the approach of the present embodiment allows a user to start the calibration procedure earlier and/or at a point which is more reliably in the steady state temperature regime.

The invention claimed is:
1. A motion capture system comprising:
a plurality of cameras; and a processing unit configured to perform processing using image data from each of the plurality of cameras, wherein each of the cameras comprises an accelerometer and the processing unit is configured to perform processing that is dependent on an output from the accelerometers;

wherein the processing unit is configured to perform a first direction-selected processing associated with a camera when a perturbation in the acceleration at the camera in a first direction is detected and to perform a second direction-selected processing associated with the camera when a perturbation in the acceleration at the camera in a second direction is detected, the first and second directions being different from each other, and the first and second direction-selected processings being different from each other.

2. The system of claim 1, wherein the processing unit is configured to:

select one of the cameras based on an output from the accelerometer; and perform a selected-camera processing which depends on which of the cameras has been selected.

3. The system of claim 2, wherein the selected-camera processing comprises displaying data from the selected camera.

4. The system of claim 3, wherein the selected-camera processing comprises displaying data from a plurality of the cameras and providing visual information indicating which of the displayed data corresponds to the selected camera.

5. The system of claim 3, wherein the selected-camera processing comprises displaying data from the selected camera and not displaying data from any other camera.

6. The system of claim 2, wherein the displayed data comprises image data captured by the selected camera.

7. The system of claim 2, wherein the displayed data comprises configuration data of the selected camera.

8. The system of claim 2, wherein the selected-camera processing comprises providing a selected-camera interface to a user that allows a user to control the selected camera.

9. The system of claim 8, wherein the selected-camera interface allows control of a plurality of the cameras and provides a visual indication indicating which of the cameras is the selected camera.

10. The system of claim 8, wherein the selected-camera interface allows control of the selected camera and no other camera.

11. The system of claim 2, wherein the processing unit is configured to select one of the cameras in response to a perturbation in the output of the accelerometer from that camera that is larger than a predetermined threshold.

12. The system of claim 2, wherein the processing unit is configured to select one of the cameras when an output of the accelerometer from that camera matches a predetermined signature output.

13. The system of claim 12, where the predetermined signature output corresponds to an output consistent with a user tapping the camera with a finger.

14. The system of claim 12, wherein the predetermined signature output corresponds to an output consistent with a user tapping the camera a predetermined multiplicity of times.

15. The system of claim 1, wherein each of the cameras is a physically separate unit and is mountable independently of the other cameras.

16. The system of claim 1, wherein the processing unit is provided in a portable computing device configured to communicate wirelessly with each of the cameras.

17. The system of claim 1, wherein the processing unit is configured to detect a change in an orientation of any of the cameras based on an output from the accelerometers.

18. The system of claim 17, wherein the detection of a change in an orientation of a camera is performed by detecting a change in the direction of gravity relative to that camera.

19. A method of performing motion capture using a plurality of cameras, wherein each of the cameras comprises an accelerometer, the method comprising:

performing processing at a processing unit that is dependent on an output from the accelerometers, wherein the processing unit is configured to perform a first direction-selected processing associated with a camera when a perturbation in the acceleration at the camera in a first direction is detected and to perform a second direction-selected processing associated with the camera when a perturbation in the acceleration at the camera in a second direction is detected, the first and second directions being different from each other, and the first and second direction-selected processings being different from each other.

20. The method of claim 19, wherein the processing comprises detecting a change in an orientation of any of the cameras based on an output from the accelerometers.

21. The method of claim 20, further comprising fixedly mounting each of the cameras so as to be directed towards a target scene and using the detected change in an orientation of a camera to detect a deviation in the mounting of the camera.

* * * * *